Inventor
Arthony R. Balchuns

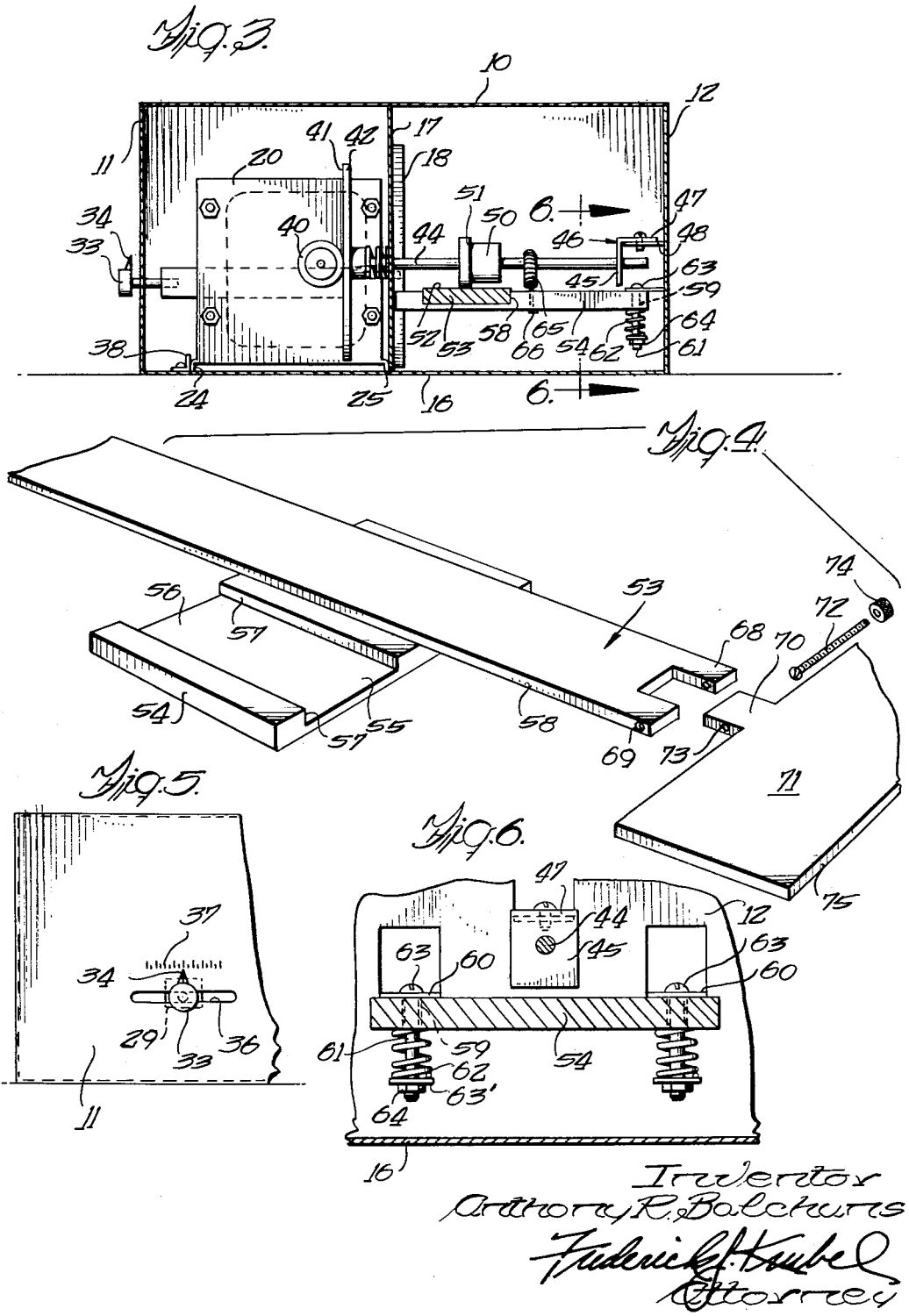

United States Patent Office 2,984,916
Patented May 23, 1961

2,984,916
READING TRAINING DEVICE
Anthony R. Balchuns, 4718 S. La Crosse Ave., Chicago, Ill.
Filed Feb. 2, 1960, Ser. No. 6,144
10 Claims. (Cl. 35—35)

This invention relates to a reading training device and more particularly to a new and improved machine for use developing speed in perception and retention of reading materials.

Through numerous tests and observations educators in the field of reading training have definitely established that the degree of comprehension of the contents of written material by a reader is related to the rate of perception and one of the primary causes of inefficient reading is due to the fact that the poor reader tends to reread fragments of previously read sentences of printed material a number of times before comprehension of the material is obtained. To overcome this difficulty and to increase reading speed and comprehension various types of machines or devices have been employed in the teaching of remedial reading which are all generally capable of moving a shutter or mask over the page of reading material at a preset rate of speed so that the student is forced to read at a rate equal to or greater than the rate of the shutter movement and cannot reread the sentences, words, etc. previously read because of the masking effect of the shutter. As the reading efficiency of the student is increased and the student is able to comprehend and understand the printed material upon a single perusal thereof at a preset shutter speed, the speed rate at which the shutter traverses over the printed matter is gradually increased. In this manner the reading ability and efficiency of the student is enhanced.

Heretofore, reading training devices and machines of the type to which the present invention relates were generally complex and thus costly to manufacture. Certain of the devices were flimsily constructed and, consequently, had short operating lives and were prone to damage and difficult and costly to maintain in good working order. It is therefore a primary objective of the present invention to provide a reading training device of the type wherein successive lines of a printed or written page are continually masked off in order to prevent rereading the page and may be accurately and minutely adjusted over a wide speed range and which device is relatively simple in construction and inexpensive to manufacture but which is durable and sturdy and capable of operating efficiently over long periods of time without repair and with a minimum of maintenance.

Another object of the present invention is to provide a reading training device capable of being used in conjunction with printed reading matter of various sizes and thicknesses and wherein the shutter or mask is angularly adjustable whereby the leading edge thereof is vertically positionable to move parallel to and lightly engage the page of the reading material being read.

Still another object of the invention is the provision of a unique mechanism for accurately and minutely adjusting the shutter speed over a wide spread range and means for maintaining the selected, adjusted rate of speed at which the shutter traverses the printed material constant throughout the travel of the shutter.

Another object is the provision of a reading training device which does not require the book or other printed material to be supported on the device or any other special supporting structure in order to be operative and the printed material can be supported on a table, desk or other supporting structure in a normal reading position.

A still further object is the provision of a new and improved guide and support means for the shutter whereby the shutter is prevented from canting or wobbling as it traverses the printed material and is maintained in alignment with the lines of the printed material as it moves across the entire page from the top to the bottom thereof.

The foregoing and other important objects and desirable features inherent and encompassed by the invention, together with many purposes and uses thereof, will become readily apparent from a reading of the ensuing description in conjunction with the annexed drawings, in which, Figure 1 is a side elevational view of a reading training device embodying the invention; a portion of the housing is broken away to better illustrate the invention;

Figure 3 is a vertical sectional view taken substantially along line 3—3 of Figure 2;

Figure 4 is an exploded perspective view of the shutter bar, shutter and pressure plate;

Figure 5 is a fragmentary, side elevational view of the housing of the device; and Figure 6 is an enlarged, detailed sectional view taken substantially along line 6—6 of Figure 3.

Figure 1:
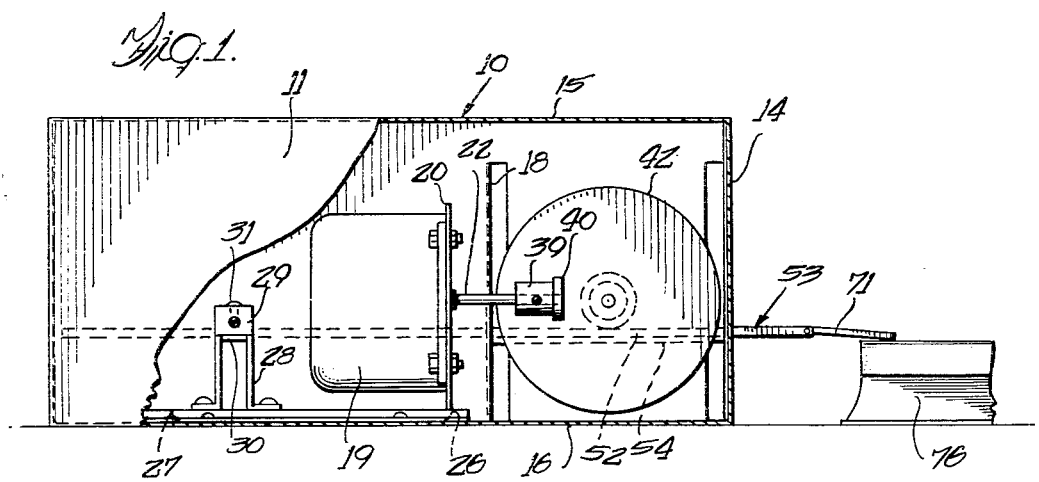

Referring to the drawings in detail, wherein like reference characters represent like elements throughout the various views, the reading training device includes a generally box-like housing, designated generally by numeral 10. The housing 10 includes a pair of spaced and parallel vertical side walls 11, 12 which have their ends suitably connected to spaced and parallel vertical rear and front walls 13, 14, respectively. The housing 10 may be constructed of any suitable material but is preferably made of sheet metal or the like. A longitudinally extending, vertical partition wall 17 extends between and is rigidly connected to the rear and front walls 13 and 14, respectively. As shown in Figure 1, a pair of longitudinally spaced and parallel tongues 18 are struck from the partition walls 17. The tongues 18 are disposed vertically and extend substantially at right angles to the general plane of the partition wall 17. The purpose of the tongues 18 will be pointed out hereinafter.

Figure 2:
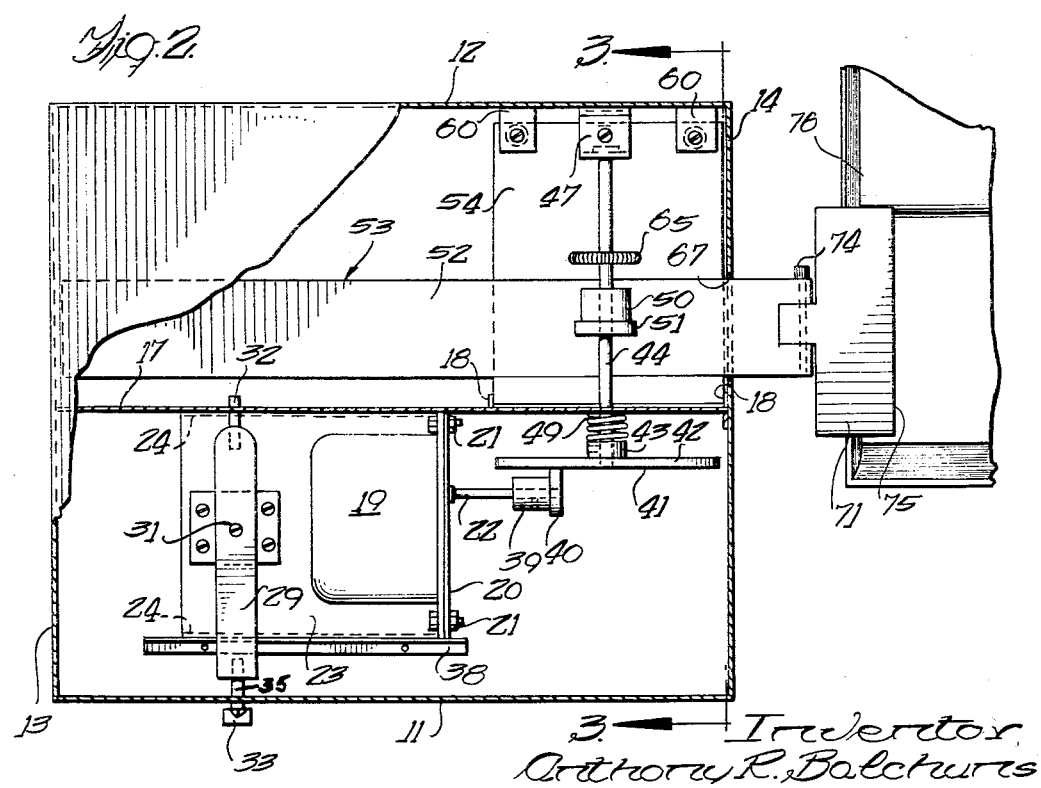
Figure 2 is a plan view of the device shown in Figure 1 with a portion of the top wall broken away.

The drive mechanism of the reading training device includes a conventional constant speed, fractional horsepower motor having internal speed reducing gearing incorporated therein which is designated generally by numeral 19. The motor 19 is fastened to a vertical mounting plate 20 by a plurality of nut and bolt means 21. The shaft 22 of the motor 19 extends longitudinally and horizontally through the mounting plate 20. The motor mounting plate 20 which is preferably made of heavy sheet metal or the like, is integrally formed with a horizontally disposed carriage 23. The longitudinally extending edges of the carriage 23 are defined by downwardly turned legs 24, the lowermost edges 25 of which rest upon the uppermost surface of the bottom wall 16. The forwardmost and rearwardmost ends 26, 27 respectively of the legs 24 are arcuate in shape to facilitate sliding of the carriage 23 on the bottom wall 16. Rigidly fastened to the carriage 23 rearwardly of the motor 19 is a substantially U-shaped support bracket 28. A speed control lever 29 has a portion thereof intermediate its ends pivotally connected to the bight 30 of the support bracket 28 by means of a pivot pin 31. As best shown in Figure 2, a fulcrum pin 32, suitably fixed to one end of the speed control lever 29, is adapted to extend through a circular opening formed in the partition wall 17. A control knob 33 having a pointer 34 is fixed to one end of a pin 35 which extends through an elongated slot 36 formed in the vertical side wall 11. The opposite end of the pin 35 is threaded into or suitably secured to the end of the lever 29 opposite the fulcrum pin 32. A calibrated speed scale 37 is carried on the outer face of the side wall 11 above the slot 36 which is cooperable with the pointer 34 to indicate the position of the pin 35 in the slot 36. The significance of the position of the pin 35 in the slot 36 will be pointed out hereinafter.

As best shown in Figure 3, the innermost leg 24 of the carriage 23 is adapted to slidingly engage the partition wall 17. The other leg 24 slidingly engages a vertical leg of a longitudinally extending guide member 38 which is substantially L-shaped in cross-section. The other leg of the guide member 38 is suitably fastened to the bottom wall 16. From the foregoing it will be appreciated that the guide member 38 and the partition wall 17 serve as track means for preventing the carriage 23 from moving transversely with respect to the housing 10 and for guiding the carriage 23 for longitudinal sliding movement with respect to the housing 10. It will also be apparent that by swinging of the control lever 29 by moving the pin 35 along the slot 36 effects longitudinal sliding movement of the carriage 23 and thus the motor 19 longitudinally within the housing 10.

The hub 39 of a cylindrical roller 40 is rigidly secured to the end of the motor shaft 22 protruding from the motor mounting plate 20. The roller 40 may be made of material having a relatively high coefficient of friction such as rubber, synthetic rubber, or the like or may have its outer peripheral surface in the form of a ring or tire made of such material. The roller 40 is adapted to frictionally engage one face 41 of a driven disc 42 which is part of a power transmission of the friction gearing type to be described presently. The engaged face 41 of the driven disc 42 is preferably made of high friction-developing material also. The driven circular disc 42 is rigidly secured to a hub 43 which, in turn, is rigidly fastened to one end of a transversely extending, horizontal driven shaft 44. It will be noted that the longitudinal axes of the motor shaft 22 and the driven shaft 44 are perpendicular to each other. One end of the shaft is supported for rotation by the circular bearing surface defining a circular opening in the partition wall 17 and similarly the opposite end is rotatably supported by the cylindrical bearing surface defining a circular opening in one leg 45 of an L-shaped bearing support bracket 46. The other leg 47 of the bearing support bracket 46 is fastened to a tab 48 struck and turned inwardly from the side wall 12. It will be appreciated that the shaft 44 and the driven disc 42 are capable of rotating with respect to the housing 10 as well as moving axially along the rotational axis of the shaft 44. As shown in Figures 2 and 3 a helically-wound compression spring 49 encircles the driven shaft 44 and is adapted to react against the partition walls 17 and the hub 43 of the circular driven disc 42 with the result that the drive roller 40 and the driven disc 42 are yieldably urged into firm frictional engagement and slippage between the roller and disc is avoided. From the foregoing, it will be appreciated that radial distance between the point of contact of the drive roller 40 and of the face 41 of the disc 42 and the rotational axis of the shaft 44 determines the rotational speed of the shaft 44 and the radial distance may be varied by shifting the motor 19 and carriage 23 longitudinal simply by grasping the speed control knot 33 and manually swinging the control lever 29.

As best shown in Figures 2 and 3, the hub 50 of a driven roller 51 is secured to the shaft 44 intermediate the ends thereof. The peripheral surface of the roller 51 like the peripheral surface of the drive roller 40 is preferably made of a material having a high coefficient of friction. The driven roller 51 is adapted to frictionally engage the uppermost surface 52 of an elongated, longitudinally extending shutter bar 53. The shutter bar 53 is supported and guided for horizontal longitudinal sliding movement by a pressure plate 54 having a generally rectangular shape in plan. As illustrated in Figure 4, the top surface of the pressure plate 54 is provided with a groove 55 adjacent one end thereof. The groove 55 is defined by a relatively flat bottom surface 56 and transversely spaced and parallel vertical side surfaces 57 extending substantially perpendicular from the bottom surface 56. The shutter bar 53 is adapted to be seated within the groove 55 and is slidable longitudinally with respect to the pressure plate 54. The side surfaces 57 of the groove 55 slidingly engage respective opposite edge portions 58 of the shutter bar 53 and are of sufficient length to prevent horizontal canting or swinging of the shutter bar 53 with respect to the pressure plate 54. The end of the pressure plate 54 opposite the groove 55 is provided with a pair of spaced apertures 59 therethrough. Each aperture is registerable with a centrally located aperture formed through a horizontally disposed supporting tab 60 struck and extending inwardly from the housing side wall 12. The shank portion 61 of a bolt is adapted to extend through each tab aperture and a registering pressure plate aperture 59 with the enlarged head 63 thereof resting on the tab 60. A helically-wound compression spring 62 encircles the depending shank portion 61 of each bolt and is adapted to have one end bear against the under side of the pressure plate 54 and its opposite end reacting against a washer 63' to resiliently urge the pressure plate end into engagement with the underside of the tabs 60. A lock nut 64 is threaded on the lowermost end of each bolt and engages the washer 63' to maintain the parts assembled. It will be noted that the diameter of the apertures 59 are slightly larger than the diameters of the shank portions 61 of the bolts 62. Consequently, the pressure plate 54 is capable of pivoting about a longitudinally extending, horizontal axis with respect to the housing 10. In order to avoid slippage between the driven roller 51 and the uppermost surface 52 of the shutter bar 53 a helically-wound tension spring 65 is provided. The tension spring 65 is looped over and engages a portion of the driven shaft 44 intermediate the roller 51 and the end thereof rotatably supported by the leg 45 of the bracket 46. The ends of the spring 65 are fastened to clips 66 carried by the pressure plate 54. From the foregoing it will be appreciated that the spring 65 tends to bias the pressure plate 54 in a counter clockwise direction with respect to the housing 10, as viewed in Figure 3, about the longitudinally extending, horizontal pivotal axis of the pressure plate 54 and, consequently, the uppermost surface 52 of the shutter bar 53 is yieldably urged into frictional engagement with the roller 51. Longitudinal shifting of the pressure plate 54 is effectively prevented by the vertical tongues 18. The end portion of the pressure plate 54 is received between the tongues 18 and it will be appreciated that the tongues 18 serve as guide means permitting the pressure plate 54 to pivot with respect to the housing 10 but preventing any longitudinal movement thereof.

The front wall 14 of the housing 10 is provided with a generally rectangularly-shaped slot 67 through which the shutter bar 53 is adapted to extend. The forwardmost end of the shutter bar 53 is bifurcated, as best illustrated in Figures 2 and 4, and each bifurcation 68 is provided with a transversely extending aperture 69 therethrough. A projection 70, integrally formed with and extending from a mid-portion of one edge of a shutter 71, is adapted to be received between the bifurcations 68. A threaded pivot pin 72 extends through the aligned bifurcation apertures 69 and an aperture 73 formed through the projection 70 to connect the shutter bar 53 and the shutter 71 whereby the shutter 71 is capable of being moved angularly with respect to the shutter bar 53 about a generally horizontal transversely extending axis corresponding to the longitudinal axis of the pivot pin 72 which is perpendicular to the longitudinal axis of the shutter bar 53. A clamping nut 74 having a knurled peripheral surface is threaded onto the pivot pin 72 and serves as releasable lock means for maintaining the angularly adjusted position of the shutter 71 with respect to the shutter bar 53 upon tightening of the nut 74 on the pivot pin 72. It will be appreciated that by adjusting the shutter 71 angularly with respect to the shutter bar 53 the leading edge 75 of the shutter 71 is moved vertically with respect to the surface upon which the housing 10 is supported to compensate for different thicknesses of reading material and permit the leading edge 75 to be positioned closely adjacent to and parallel to or lightly engaging the sheet or page of reading material to be read. Thus the device can be used with books, single sheets or any other readily available material having a relatively wide range of thicknesses.

In use, assuming that the shutter bar 53 in its fully retracted position as shown in Figure 1, the reading material such as a book 76 is placed on the top surface of a desk, table or other supporting structure forwardly of and adjacent to the front wall 14 of the housing 10. The knurled nut 74 is loosened sufficiently to permit pivoting of the shutter 71 with respect to the shutter bar 53 and the shutter 71 is then adjusted so as to lie closely adjacent to or rest lightly against the top of the page of the book 76 to be read. If necessary the book is oriented so that the leading edge 75 of the shutter 71 is parallel to the lines of printed words on the page. The desired rate of speed at which the shutter 71 moves over the book 76 is set by grasping the speed control knob 33 and pivoting the speed control lever 29 until the indicator pointer 34 is in alignment with the indicia on the calibrated scale 37 corresponding to the desired shutter speed. It will be appreciated that when the speed control lever 29 is pivoted longitudinal sliding movement of the motor 19 and the drive roller 40 is effected. Consequently, such longitudinal movement of the drive roller 40 results in a radial variance of the point of frictional engagement of the roller 40 and the face 41 of the disc 42 with respect to the rotational axis of the shaft 44 and various speed transmission ratios between the motor shaft 22 and the driven shaft 44 are obtained. It will be appreciated that if the motor 19 is shifted to the right causing the point of contact between the drive roller 40 and the face 41 of the disc 42 to radially approach the rotational axis of the shaft 44 the rate of speed at which the shutter 71 traverses the book 76 is increased. Once the pointer 34 is set to obtain the desired shutter speed the motor 19 is energized and the shutter 71 commences to traverse the page of the book 76 at the selected shutter speed. Because of the biasing action of the springs 65 and 49 slippage in the drive line between the motor 19 and the shutter 71 is eliminated and the shutter speed is unvarying and substantially constant as the shutter 71 traverses the reading material. When the shutter 71 reaches the bottom of the page and the shutter bar 53 is at or near its fully extended position and it is desired to reset the shutter bar 53 to its fully retracted position it is merely necessary to grasp the shutter bar 53 adjacent the shutter 71 and push the shutter bar rearwardly with respect to the housing 10. Resetting of the shutter bar 53 may be accomplished without injury or damage to any of the parts of the device even though the motor 19 continues to operate during the resetting operation.

The embodiment of the invention chosen for the purposes of illustration and description herein is that preferred for achieving the objects of the invention and developing the utility thereof in the most desirable manner, due regard being had to existing factors of economy, simplicity of design and construction, production methods and the improvements sought to be effected. It will be appreciated therefore that the particular structural and functional aspects emphasized herein are not intended to exclude, but rather to suggest, such other adaptations and modifications of the invention as fall within the spirit and scope of the invention as defined in the appended claims.

What is claimed is:

1. A reading training device comprising a box-like housing; an elongated shutter bar having an end portion extending outwardly from the vertical front wall of said housing; a shutter; means for pivotally connecting said shutter to the end of said bar disposed without said housing whereby said shutter is angularly adjustable about a substantially horizontal axis perpendicular to the longitudinal axis of said bar to various angular positions with respect to said bar, said means including means for releasably locking said shutter in any of said angular positions; support and guide means for supporting and guiding said bar for substantially horizontal movement along the longitudinal axis of said bar including a plate, the uppermost surface of said plate having a groove formed therein adjacent one end thereof, the surface of said plate defining the bottom of the groove being adapted to slidingly engage the lowermost surface of said bar and the laterally spaced and parallel vertical surfaces of said plate defining the longitudinally extending sides of the groove being adapted to slidingly engage longitudinal edge portions of said bar; means for pivotally connecting the end of said plate opposite the end having the groove adjacent thereto to said housing for pivotal movement about a substantially horizontal longitudinally extending axis; drive means operatively connected to said bar for moving said bar in one direction along the longitudinal axis of said bar including a transversely extending shaft supported within said housing for rotation, the rotational axis of said shaft being spaced above said plate and substantially perpendicular to a vertical plane containing the pivotal axis of said plate, said drive means including a friction wheel secured to a portion of said shaft intermediate the ends thereof in vertical alignment with said bar; and biasing means for pivoting said plate in one direction to yieldably urge the uppermost surface of said bar into frictional engagement with said friction wheel.

2. A reading training device as set forth in claim 1 wherein said drive means further includes a friction disc secured to one end of said shaft; a constant speed, electric motor means having a horizontally extending shaft, the rotational axis of said shaft being substantially perpendicular to the rotational axis of said first mentioned shaft; and a friction roller fixed to said motor shaft adapted to frictionally engage a portion of a face of said disc radially spaced from the rotational axis of said first mentioned shaft.

3. A reading training device as set forth in claim 2, including manually operable means for varying the radial spacing of the point of frictional engagement contact between said roller and said disc with respect to the rotational axis of said first mentioned shaft to selectively vary the speed of said bar.

4. A reading training device as set forth in claim 3, including biasing means for yieldably urging said roller and face of said disc relatively toward each other.

5. A reading training device comprising a box-like housing; an elongated shutter bar having an end portion extending outwardly from the vertical front wall of said housing; a shutter operatively connected to the end of said bar disposed without said housing; support and guide means for supporting and guiding said bar for substantially horizontal movement along the longitudinal axis of said bar; drive means operatively connected to said bar for moving said bar in one direction along the longitudinal axis of said bar including a transversely extending horizontal driven shaft disposed above said bar having a friction wheel secured thereto in frictional driving engagement with said bar, a constant speed, electric motor having a longitudinally extending horizontal shaft, the rotational axis of said shaft being substantially perpendicular to the rotational axis of said driven shaft, a disc secured to one end of said driven shaft, and a friction roller fixed to said motor shaft adapted to frictionally engage a portion of a face of said disc radially spaced from the rotational axis of said driven shaft; and manually operable means for varying the radial spacing of the point of frictional engagement contact between said roller and disc with respect to the rotational axis of said driven shaft to selectively vary the speed of said bar.

6. A reading training device as set forth in claim 5, wherein said manually operable means includes a support for said electric motor supported and guided on the bottom wall for longitudinal sliding movement with respect to said housing, a control lever supported by said housing for pivotal movement about a vertical axis, and means operatively connecting said motor support and control lever whereby pivoting of said control lever effects longitudinal sliding movement of said motor support.

7. A reading training device comprising a box-like housing; an elongated shutter bar having an end portion extending outwardly from a vertical wall of said housing; a shutter pivotally connected to the end of said shutter bar disposed without said housing for pivotal movement about an axis perpendicular to the longitudinal axis of said bar; support and guide means for supporting and guiding said bar for substantially horizontal movement along the longitudinal axis of said bar including a plate, the uppermost surface of said plate having a groove formed therein, the surface of said plate defining the bottom of the groove being adapted to slidingly engage the lowermost surface of said bar and the laterally spaced and parallel vertical surfaces of said plate defining the longitudinally extending sides of the groove being adapted to slidingly engage longitudinal edge portions of said bar; means for pivotally connecting one end of said plate to said housing for pivotal movement about a longitudinally extending axis; drive means operatively connected to said bar for moving said bar in one direction along the longitudinal axis of said bar including a transversely extending shaft supported within said housing for rotation, the rotational axis of said shaft being spaced above said plate and substantially perpendicular to a vertical plane containing the pivotal axis of said plate, said drive means including a friction wheel secured to said shaft in vertical alignment with said bar; and biasing means for pivoting said plate in one direction to yieldably urge the uppermost surface of said bar into frictional engagement with said friction wheel.

8. A reading training device comprising an elongated shutter bar; a shutter operatively connected to one end of said bar; support and guide means for supporting and guiding said bar for substantially horizontal movement along the longitudinal axis of said bar including a plate, the uppermost surface of said plate having a groove formed therein, the surface of said plate defining the bottom of the groove being adapted to slidingly engage the lowermost surface of said bar and the laterally spaced and parallel vertical surfaces of said plate defining the longitudinally extending sides of the groove being adapted to slidingly engage longitudinal edge portions of said bar; drive means operatively connected to said bar for moving said bar in one direction along the longitudinal axis of said bar including a transversely extending, rotatable shaft disposed above said plate and a friction wheel secured to said shaft in vertical alignment with said bar; and biasing means for yieldably urging said frictional wheel into frictional engagement with the uppermost surface of said bar.

9. A reading training device as set forth in claim 8, wherein said drive means further includes a friction disc secured to one end of said shaft; a constant speed electric motor means having a horizontally extending shaft, the rotational axis of said shaft being substantially perpendicular to the rotational axis of said first mentioned shaft; and a friction roller fixed to said motor shaft adapted to frictionally engage a portion of a face of said disc radially spaced from the rotational axis of said first mentioned shaft.

10. A reading training device as set forth in claim 9, including manually operable means for varying the radial spacing of the point of frictional engagement contact between said roller and disc with respect to the rotational axis of said first mentioned shaft to selectively vary the speed of said bar.

References Cited in the file of this patent

UNITED STATES PATENTS

| | | |
|---|---|---|
| 2,568,577 | Alexander | Sept. 18, 1951 |
| 2,605,558 | Lehner et al. | Aug. 5, 1952 |
| 2,632,258 | Erickson | Mar. 24, 1953 |
| 2,765,543 | Crowell et al. | Oct. 9, 1956 |